(12) United States Patent
Clark (10) Patent No.: US 8,784,028 B2
(45) Date of Patent: Jul. 22, 2014

(54) TETHERED FASTENING DEVICE

(71) Applicant: David L. Clark, Manhattan Beach, CA (US)

(72) Inventor: David L. Clark, Manhattan Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 163 days.

(21) Appl. No.: 13/653,142

(22) Filed: Oct. 16, 2012

(65) Prior Publication Data

US 2014/0101923 A1   Apr. 17, 2014

(51) Int. Cl.
*F16B 43/00*   (2006.01)

(52) U.S. Cl.
USPC ............ 411/372; 411/533; 411/999; 411/204

(58) Field of Classification Search
USPC ......... 411/190, 533, 999, 197, 204, 531, 532, 411/272
IPC ...................................................... F16B 39/10
See application file for complete search history.

(56) References Cited

U.S. PATENT DOCUMENTS

| | | | | |
|---|---|---|---|---|
| 1,320,095 A | * | 10/1919 | Robinson | 411/201 |
| 1,350,230 A | * | 8/1920 | McCain, Jr. | 411/201 |
| 1,734,743 A | * | 11/1929 | Paul | 411/235 |
| 2,948,317 A | * | 8/1960 | Munro | 411/352 |
| 3,289,521 A | * | 12/1966 | Van Sloun | 411/340 |
| 3,648,749 A | * | 3/1972 | Warren | 411/87 |
| 8,142,124 B2 | | 3/2012 | Kulesha | |
| 2008/0260491 A1 | * | 10/2008 | Soeda et al. | 411/194 |

FOREIGN PATENT DOCUMENTS

GB    2 159 447 A    12/1985
JP    2003113828    4/2003

OTHER PUBLICATIONS

Industry Publication entitled: "*Southco 81-82-85 Information Guide*", www.southco.com , pp. 269-274, 276; 272-285; 497.
International Search Report for corresponding PCT/US2013/062873, completed Jan. 3, 2014 by Johann Rochus of the EPO.

* cited by examiner

*Primary Examiner* — Gary Estremsky
(74) *Attorney, Agent, or Firm* — Tarolli, Sundheim, Covell & Tummino LLP (57) ABSTRACT

A penetrating fastener has a fastener head and fastener tip spaced apart by a longitudinally oriented fastener shaft. A tetherable washer has a substantially planar base surface having a fastener aperture extending therethrough. A longitudinally oriented wall extends longitudinally upward from at least a portion of the base surface to form a concave fastener cavity configured to receive at least a portion of the fastener head. Two tether apertures extend laterally through the wall and are laterally spaced apart along the wall. Both of the tether apertures are laterally arranged along the wall in a rotationally asymmetric configuration. A first one of the tether apertures is located a second longitudinal distance from the base surface and a second one of the tether apertures is located a third longitudinal distance from the base surface. The tether apertures are configured to simultaneously accept a tether extending through both of the tether apertures.

22 Claims, 5 Drawing Sheets

TETHERED FASTENING DEVICE

GOVERNMENT CONTRACT

The Government of the United States of America has rights in this invention pursuant to a U.S. Government Contract.

TECHNICAL FIELD

The present invention relates to an apparatus and method for use of a tethered fastening device and, more particularly, to a fastening system for tethering a penetrating fastener to an anchor structure.

BACKGROUND OF THE INVENTION

Assembly of large base structures such as space stations, drilling platforms, and precision clearance machinery requires a strict accounting of assembly hardware to ensure that stray hardware does not become lost, possibly causing damage to the base structure. For example, a nut or bolt drifting away from a space station may become a long-term projectile hazard to subsequent spacecraft in the vicinity of the space station. A bolt dropped into a reduction gear may cause damage to the gears which leads to jamming of the machinery, rendering it inoperable. In an elevated application such as skyscraper construction, a dropped fastener could be dangerous to people or equipment underneath, as well as inconvenient for a user who must carry extra fasteners in case of loss. A fastener that falls into some portion of a spacecraft could cause an on-orbit failure of an antenna or solar array deployment, potentially making a multi-million dollar spacecraft useless. A fastener falling into a jet engine, aircraft landing gear retraction system, or flight control mechanism could cause a life threatening failure. A fastener lost from a ribcage separation fixture could be left behind inside an open heart surgery patient. In addition to "permanently installed" fasteners, there is also a need for accountability or control of fasteners for equipment that is used temporarily and/or repetitively with or near sensitive equipment. Retrieving fasteners or similar hardware after they have been dropped or otherwise lost is often difficult, if not impossible.

The problem of lost or misplaced fasteners can cause significant inconvenience and expense for base structures in underwater, outer space, and other isolated or unusual locations. Accordingly, tethered fasteners have become common for use in any environments in which it is desirable to prevent a fastener from becoming freely detached from a base structure.

Most tether methods involve some modification to the fastener, such as by the creation of a groove at the base of the threads or in the head. This modification can cause delays and expense in manufacturing, can compromise the corrosion protection coating/treatment, and can weaken the fastener. Additionally, this modification must be documented on the engineering drawings for each fastener modified—costing additional time and effort—and requires that these specialty fasteners, which might not be readily available in the field, to be used for proper tethering.

Existing tether methods that do not require fastener modification involve placing the fastener into a hole toward one end of a large rectangular sheet metal "washer" and then bending the other end of this makeshift "washer" over the top of the fastener head to prevent its escape. The result is a large "C-shaped" bracket hanging over the fastener head. By design, this bracket must be easy enough to bend so that the fastener can be inserted and the bracket bent over the fastener head (usually by hand), but this malleability makes the bracket weak enough to be accidently bent or even broken by casual contact. This "C-shaped" bracket also has an inconvenient tendency to snag on clothing, cables, lanyards, tethers, and other nearby structures which brush against the bracket during movement, thus causing damage to the bracket and/or the contacting structure and possibly negating any "tethering" function of the bracket. Finally, the "C-shaped" bent-washer bracket is difficult to unbend and re-use if the fastener must be removed and replaced, so is a one-time-use item which itself may result in unwanted extra debris or free-floating objects (e.g., in undersea or outer space use environments).

SUMMARY OF THE INVENTION

In an embodiment of the present invention, a fastening system is described. A penetrating fastener has a longitudinally separated fastener head and fastener tip spaced apart by an elongate, longitudinally oriented fastener shaft. A tetherable cavity washer has a substantially planar base surface having a fastener aperture extending longitudinally therethrough. The fastener aperture has at least one lateral dimension less than a corresponding lateral dimension of the fastener head. A longitudinally oriented wall extends longitudinally upward to at least a first longitudinal distance from at least a portion of the base surface to form a concave fastener cavity configured to receive at least a portion of the fastener head concurrently with at least a portion of the fastener shaft extending through the fastener aperture of the base surface. Two tether apertures extend laterally through the wall. The tether apertures are laterally spaced apart along the wall. Both of the tether apertures are laterally arranged along the wall in a rotationally asymmetric configuration. A first one of the tether apertures is located a second longitudinal distance from the base surface and a second one of the tether apertures is located a third longitudinal distance from the base surface. Both the second and third longitudinal distances are greater than a longitudinal thickness of the fastener head. An elongate tether has first and second tether ends separated by a tether body. The tether apertures are configured to simultaneously accept the tether body extending through both of the tether apertures.

In an embodiment of the present invention, a tetherable cavity washer is described. A substantially planar base surface has a fastener aperture extending longitudinally therethrough. The base surface has a base surface perimeter. The entirety of the fastener aperture is located in a laterally spaced-apart relationship with the base surface perimeter. A longitudinally oriented wall extends longitudinally upward to at least a first longitudinal distance from at least a portion of the base surface perimeter. Two tether apertures extend laterally through the wall. The tether apertures are laterally spaced apart along the wall. Both of the tether apertures are laterally arranged along the wall in a rotationally asymmetric configuration.

In an embodiment of the present invention, a method of tethering a penetrating fastener is described. The fastener has a longitudinally separated fastener head and fastener tip spaced apart by an elongate, longitudinally oriented fastener shaft. A tetherable cavity washer is provided, the cavity washer having a substantially planar base surface having a fastener aperture extending longitudinally therethrough. The fastener aperture has at least one lateral dimension less than a corresponding lateral dimension of the fastener head. A longitudinally oriented wall extends longitudinally upward to at least a first longitudinal distance from at least a portion of the base surface to form a concave fastener cavity. Two tether apertures extend laterally through the wall. The tether apertures are laterally spaced apart along the wall. Both of the tether apertures are laterally arranged along the wall in a rotationally asymmetric configuration. A first one of the tether apertures is located a second longitudinal distance from the base surface and a second one of the tether apertures is located a third longitudinal distance from the base surface. Both the second and third longitudinal distances are greater than a longitudinal thickness of the fastener head. At least a portion of the fastener shaft is inserted through the fastener aperture. At least a portion of the fastener head is received within the fastener cavity. An elongate tether, having first and second tether ends separated by a tether body, is provided. The tether body is extended simultaneously through both of the tether apertures. The fastener head is substantially blocked, with a portion of the tether body extending between the two tether apertures, from exiting the fastener cavity through movement oriented longitudinally away from the base surface.

BRIEF DESCRIPTION OF THE DRAWINGS

For a better understanding of the invention, reference may be made to the accompanying drawings, in which.

DESCRIPTION OF EMBODIMENTS

Figures 1, 2:
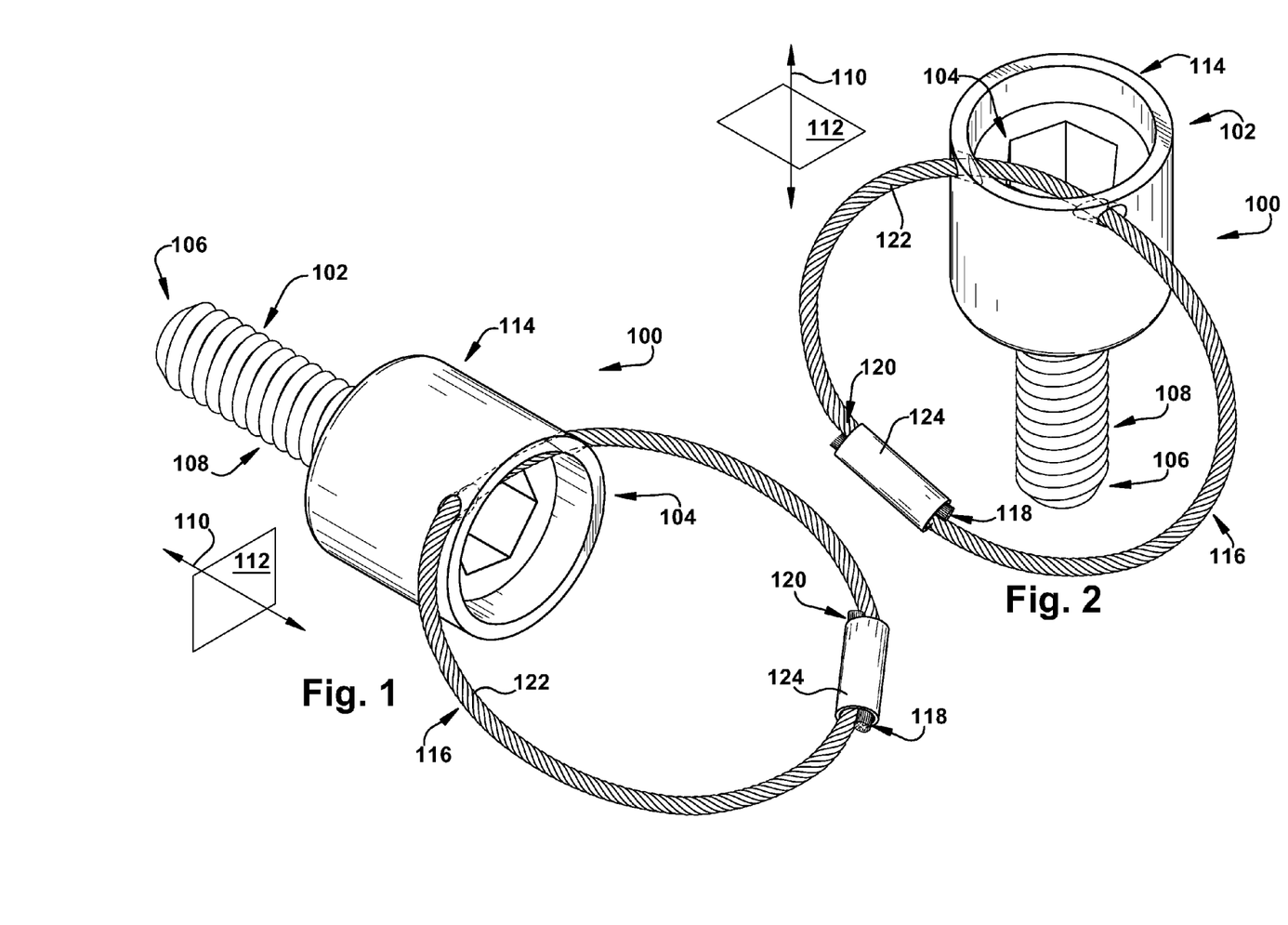
FIG. 1 is a perspective top view of one embodiment of the present invention.
FIG. 2 is a perspective side view of the embodiment of FIG. 1.

In accordance with the present invention, FIG. 1 depicts a fastening system 100. A penetrating fastener 102 has a longitudinally separated fastener head 104 and fastener tip 106 spaced apart by an elongate, longitudinally oriented fastener shaft 108. Herein, the direction "longitudinal", shown by longitudinal arrow 110 in the Figures, is substantially derived from the orientation of the fastener 102 in the assembled fastening system 100. A "lateral" direction, as described herein, is substantially located within or along a lateral plane 112 which is substantially perpendicular to the longitudinal direction.

The fastener 102 may be of any suitable type, but is contemplated as having the fastener shaft 108 configured for penetration or insertion into an underlying structure and long-term maintenance in that penetrated or inserted position, with the fastener head 104 remaining at least partially and/or selectively accessible from the ambient space on the insertion side of that underlying structure. The fastener shaft 108 may include threads, grooves, barbs, or any other desired features to assist with maintaining the fastener 102 in a desired inserted position. Examples of suitable fasteners 102 for use with the fastening system 100 include, but are not limited to, screws, bolts, rivets, anchors, nails, staples, or any other desired fastener type.

A tetherable cavity washer 114 is selectively attachable to the fastener 102, as shown in FIGS. 1-2. As used herein, the term "cavity washer" indicates a cup-shaped or other "three-dimensional" (i.e., not entirely flat) item which is at least partially interposed between a fastener 102 and a fastener-receiving structure, to ensure tightness, prevent leakage, distribute load, insulate, relieve friction, or for any other desired purpose in the joint or finished fastener assembly. While conventional hardware "washers" are generally flat, thin rings or disks, perforated plates, or other planar, roughly two-dimensional structures, the term "cavity washer" as used herein includes these as well as items (such as those shown in the Figures) which have a three-dimensional structure extending out of the plane of the "conventional" washer but which are also at least partially interposed between the fastener 102 and the fastener-receiving structure. Here, the cavity washer may perform one or more functions of a conventional washer, such as preventing direct contact between a fastener head 104 and an underlying surface.

The fastening system also includes a tether 116, as shown in FIGS. 1-2. The tether 116 has first and second tether ends 118 and 120, respectively, separated by a tether body 122. As shown here, the first and second tether ends 118 and 120 are connected together through the use of a joining sleeve 124. However, as will be discussed below, the first and second tether ends 118 and 120 could each be attached to each other, to another structure (not shown), or left hanging/unattached, as desired for a particular use environment of the present invention.

As is apparent in both of FIGS. 1 and 2, the tether body 122 is extending simultaneously through two tether apertures 126 in the cavity washer 114, which will be discussed in detail below. As can be seen in FIG. 2, the tether body 122 is positioned to substantially prevent or block longitudinal movement of the fastener head 104 out of the cavity washer 114.

Figure 3:
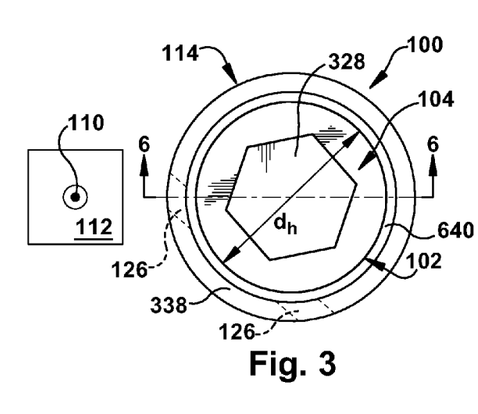
FIG. 3 is a partial schematic top view of the embodiment of FIG. 1.
Figure 4:
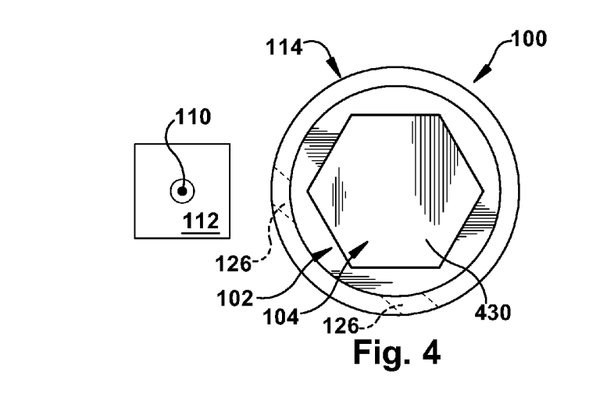
FIG. 4 is a partial schematic top view of an alternate configuration of the embodiment of FIG. 1.

With reference to FIG. 3, a top view of the fastening system 100 shows a socket-head fastener 102 assembled with a cavity washer 114. The socket-head fastener head 104 depicted in FIGS. 3-4 includes a tool-engaging feature (here a tool cavity 328) located on a side of the fastener head 104 opposite the fastener shaft 108. As shown in FIG. 3, the tool cavity 328 is configured to accept an Allen wrench, which can be used to manipulate the fastener 102 (e.g., tighten or loosen the fastener) during use of the fastening system 100. As another example, FIG. 4 shows a top view of a fastening system 100 in which the fastener head 104 includes a tool-engaging feature (here a hexagonal face 430, defined by a plurality of flatted sides of the fastener head 104) on a side of the fastener head opposite the fastener shaft 108. The hexagonal face 430 is configured to mate with a hexagonal socket, which can be used to manipulate the fastener 102 during use of the fastening system 100. Any desired type of tool-engaging feature and corresponding manipulation tool may be used with the present invention, such as, but not limited to, a manipulation tool which is an Allen wrench, Philips screwdriver, slotted screwdriver, TORX™ wrench, Robertson wrench, inside hex wrench, or any other suitable manipulation tool or combination thereof.

In certain use environments of the present invention, it may be desirable for the tool-engaging feature to be longitudinally accessible by a manipulation tool when the tether body 122 is simultaneously extending through both of the tether apertures 126. In other use environments of the present invention, it may be desirable for the tether body 122, when simultaneously extending through both of the tether apertures 126, to at least partially block longitudinal access of the tool-engaging feature by the manipulation tool. One of ordinary skill in the art can readily provide a suitable tool-engaging feature and/or manipulation tool for a particular embodiment of the present invention. The below description is agnostic and apathetic as to the mechanism of manipulation (loosening or tightening) of the fastener and the design of the associated manipulation tool(s) and/or tool-engaging feature.

Figure 5:
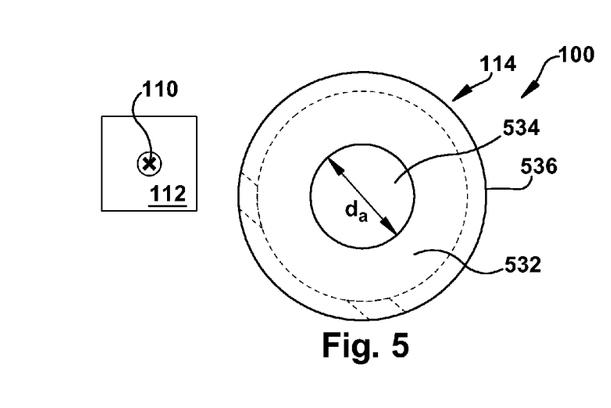
FIG. 5 is a partial schematic bottom view of the embodiment of FIG. 1.

The cavity washer 114 will now be discussed in detail, with particular reference to FIGS. 3 and 5-6. As can be seen in the bottom view of FIG. 5 (the fastener 102 is absent from this Figure), the cavity washer 114 has a substantially planar base surface 532 having a fastener aperture 534 extending longitudinally therethrough. Optionally, and as shown in FIG. 5, the base surface 532 can have a base surface perimeter 536 (here, the outer circumference of the circular base surface), and the entirety of the fastener aperture 534 can be located in a laterally spaced-apart relationship with the base surface perimeter. In other words, the fastener aperture 534 can be, as in the FIG. 5 view, spaced apart, in the lateral plane 112, from all of the base surface perimeter 536. Alternately, though not shown, at least a portion of the fastener aperture 534 can be contiguous with at least a portion of the base surface perimeter—for example, a fastener aperture could be a "bite" out of one side of the base surface 532, to make an otherwise circular base surface have a crescent or "c-shaped" appearance when viewed in the lateral plane 112.

The fastener aperture 534 may have at least one lateral dimension which is less than a corresponding lateral dimension of the fastener head 104. For example, and with reference to FIGS. 3 and 5, the diameter ($d_a$) of the fastener aperture 534, taken in a lateral plane 112 (i.e., a plane substantially perpendicular to the longitudinal direction 110), may be smaller than the diameter ($d_h$) of the fastener head 104, taken in a lateral plane 112 (i.e., a plane substantially perpendicular to the longitudinal direction 110), even if the respective lateral planes in which these diameters $d_a$ and $d_h$ are taken are not coincident (i.e., are spaced longitudinally apart). This mismatch of lateral dimensions between the fastener aperture 534 and the fastener head 104, when present, may prevent the fastener head 104 from passing through the fastener aperture 534, in a known manner. That is, the fastener aperture 534 could be dimensioned and configured to permit longitudinal insertion therethrough of at least a portion of the fastener shaft 108, into the configuration shown in FIG. 6, but to prevent longitudinal passage of the fastener head 104 therethrough.

In addition to the fastener aperture 534, the cavity washer 114 may also include a longitudinally oriented wall 338 extending longitudinally upward (e.g., toward the top of the page in the orientation of FIG. 6) from at least a portion of the base surface 532. The wall 338 extends longitudinally at least a first longitudinal distance α from the base surface 532, such as from at least a portion of the base surface perimeter 536. The wall 338, optionally collectively with the base surface 532, forms a concave fastener cavity 640 configured to receive at least a portion of the fastener head 104 concurrently with at least a portion of the fastener shaft 108 extending through the fastener aperture 534 of the base surface. In certain embodiments of the present invention, the wall 338 may help to strengthen the edge of the cavity washer 114. For example, the wall 338 may be helpful in bolstering the stability of a fastening system 100 used in a slotted hole application, where the base surface 532 only contacts the slot on two small portions of the perimeter of the base surface perimeter 536.

Figure 6:
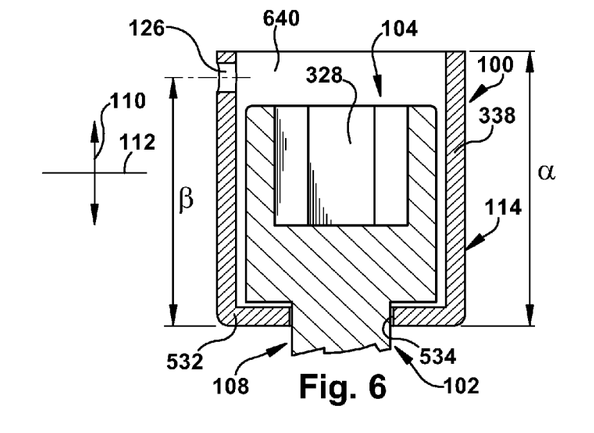
FIG. 6 is a cross-sectional view taken along line 6-6 of FIG. 3.
Figures 7, 8, 9, 10:
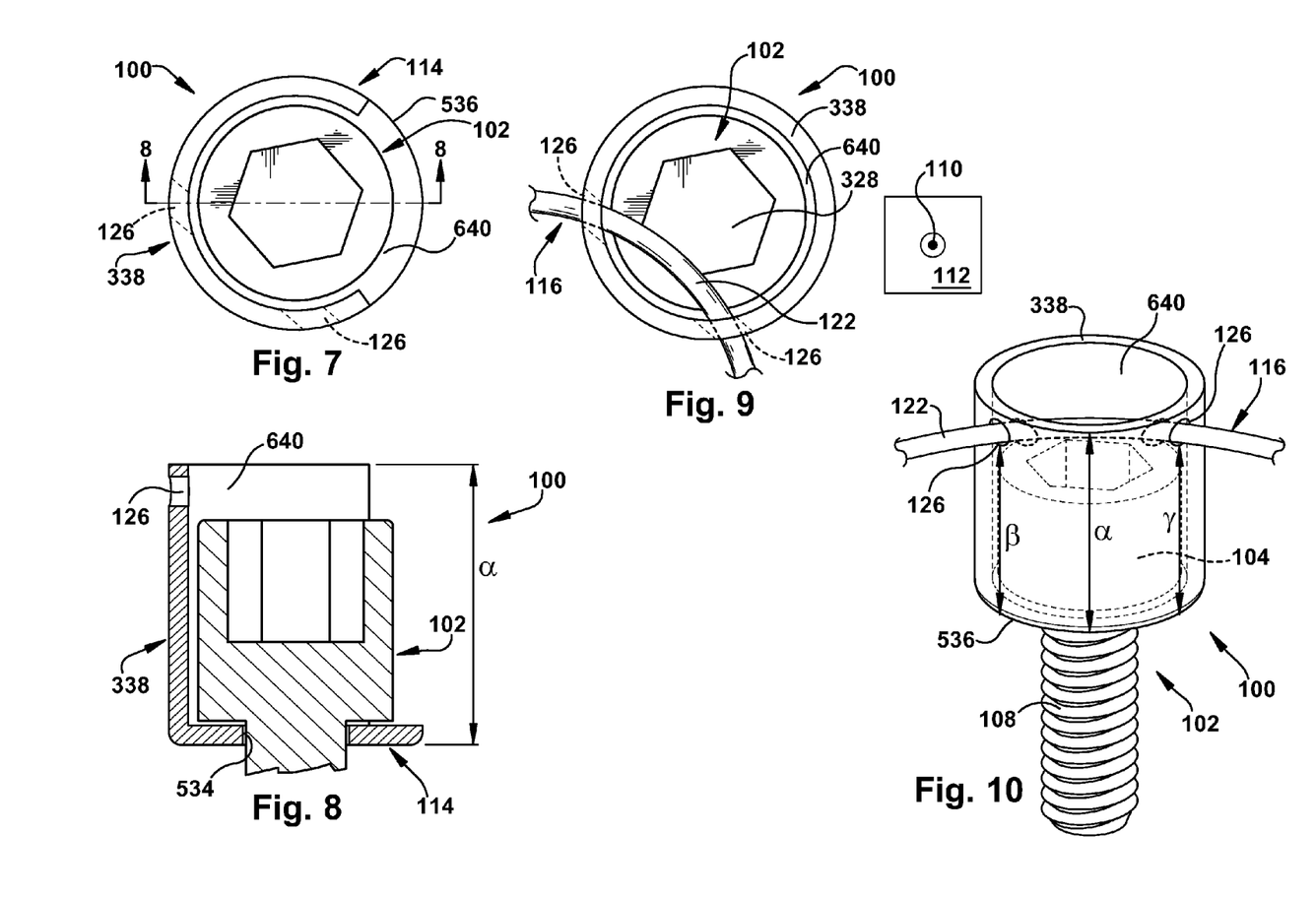
FIG. 7 is a partial schematic top view of an alternate configuration of the embodiment of FIG. 1.
FIG. 8 is a cross-sectional view taken along line 8-8 of FIG. 7.
FIG. 9 is a partial schematic top view of the embodiment of FIG. 1.
FIG. 10 is a partial perspective side view of the embodiment of FIG. 9.

In the embodiment shown in FIGS. 3 and 6, the wall 338 extends longitudinally upward from the entirety of the base surface perimeter 536. Accordingly, the wall 338 and base surface 532 collectively provide a cup-shaped cavity washer 114 having a substantially cylindrical fastener cavity 640. Alternatively, and as shown in FIGS. 7-8, the wall 338 could extend longitudinally upward from just a portion of the base surface perimeter 536, resulting in a fastener cavity 640 which has an open-sided cylindrical shape. It is also contemplated, though not shown, that the wall 338 could extend longitudinally to an irregular "height" above the base surface 532, as opposed to the substantially even first longitudinal distance α shown. Additionally or alternatively, it is contemplated, though not shown, that at least a portion of the wall 338 could extend from a portion of the base surface 532 that is not the base surface perimeter 536.

Turning now to FIGS. 9-10, the tether apertures 126 will now be described in detail. As shown in these Figures, two tether apertures 126 extend laterally (i.e., in a lateral direction from the longitudinal direction 110) through the wall 338, and the below description will presume two tether apertures, though any suitable number could be provided. The tether apertures 126 are laterally spaced apart from one another along the wall 338 in a rotationally asymmetric configuration. Here, the phrase "rotationally asymmetric configuration" is used to indicate that, when viewed in the lateral plane as in the orientation of FIG. 9, both tether apertures 126 are located toward one side of the well 338.

Stated differently, when a laterally oriented "slice" of the wall (as shown in FIG. 9) is rotated upon its own axis through 360°, there is no degree of rotation at which the tether apertures 126 are positioned identically to their positions at the beginning and end of the rotation. It should be noted, however, that the tether apertures 126 could be at different "heights" (i.e., longitudinally separated from one another), and that the wall 338 need not be circular—both the shape of the wall in the lateral plane and the longitudinal placement of the tether apertures along the wall are irrelevant to the determination of rotational asymmetry of the tether apertures in the lateral direction.

With reference to FIG. 10, a first one of the tether apertures 126 may be located a second longitudinal distance β from the base surface 532. A second one of the tether apertures 126 may be located a third longitudinal distance γ from the base surface 532. The second and third longitudinal distances β and γ represent the longitudinal heights of the tether apertures 126 upon the wall 338 (which itself extends a first longitudinal distance α above the base surface 532). The second and third longitudinal distances β and γ may be substantially the same (as shown in the Figures) or could be different, but it is contemplated that, for most embodiments of the present invention, the second and third longitudinal distances β and γ will each be less than the first longitudinal distance α, or longitudinal elevation, of the wall 338 such that the tether apertures 126 are both located on or through the wall.

In the fastening system 100, a fastener 102 is presumed to have been preselected for operative engagement with the cavity washer 114. Accordingly, the thickness (i.e., longitudinal height) of the fastener head 104 is known. The second and third longitudinal distances β and γ should then be chosen to be greater than the longitudinal thickness of the fastener head 104. As a result, when the fastener shaft 108 of the fastener 102 is inserted into the fastener aperture 534 of the cavity washer 114, the fastener head 104 will be at least partially located in the fastener cavity 640 with at least a portion of the fastener head 104 located laterally adjacent to the wall 338 but longitudinally below the tether apertures 126, as shown in dotted line in FIG. 10 and in cross-section in FIGS. 6 and 8. When the wall 338 creates a substantially cylindrical fastener cavity 640, as in the FIG. 6 embodiment, the fastener head 104 will be substantially laterally surrounded by the wall when the fastener head is at least partially located within the fastener cavity.

When the fastener head 104 has achieved the lateral positioning with respect to the wall 338, and the longitudinal positioning with respect to the tether apertures 126, as shown in FIGS. 6, 8, and 10, the tether 116 can be arranged to simultaneously extend through both of the tether apertures 126, in the configuration shown in FIGS. 9-10. In this configuration, which is also shown in perspective view in FIGS. 1-2, the placement/location of the tether body 122 simultaneously through both of the tether apertures 126 results in the tether body substantially preventing movement of the fastener head 104 longitudinally out of the fastener cavity 640 (i.e., upward, in the orientation of FIG. 10), to maintain the fastener 102 in a predetermined arrangement with the cavity washer 114. In other words, the presence of the tether body 122 in and/or above the fastener cavity 640 substantially blocks the fastener head 104 (and, potentially, the entire fastener 102) from exiting the fastener cavity 640 or another structure of the cavity washer 114, by movement of the fastener 102 in a longitudinal direction away from the base surface 532.

As previously described, the tether apertures 126 are laterally arranged along the wall in a rotationally asymmetric manner. Another way to consider this arrangement for certain embodiments of the present invention, when the base surface perimeter 536 defines a curve, is that the tether apertures 126 may be arranged upon a wall 338 which follows the curved base surface perimeter such that a linear tether 116 extending between the two tether apertures and located longitudinally above the base surface defines a chord having a length of less than a diameter of the curve of the base surface perimeter.

As shown in FIG. 9, this off-center placement of the tether body 122 due to the rotational asymmetry of the tether apertures 126 may allow access by a manipulation tool (not shown) to a tool-engaging feature such as the tool cavity 328 of the depicted socket-head fastener 102 even when the fastening system 100 is assembled. In contrast, if the tether apertures were to be located diametrically opposite one another along a cylindrical wall, causing the tether body to bisect the fastener cavity (not shown), then the tether body could block access of the tool-engaging feature by a manipulation tool. While this may be acceptable for use environments when the fastening system 100 is assembled after the fastener 102 is deployed as desired, loss of access of the tool-engaging feature by a manipulation tool could detrimentally interfere with assembly of the fastening system before the fastener is associated with an underlying structure.

Figure 11:
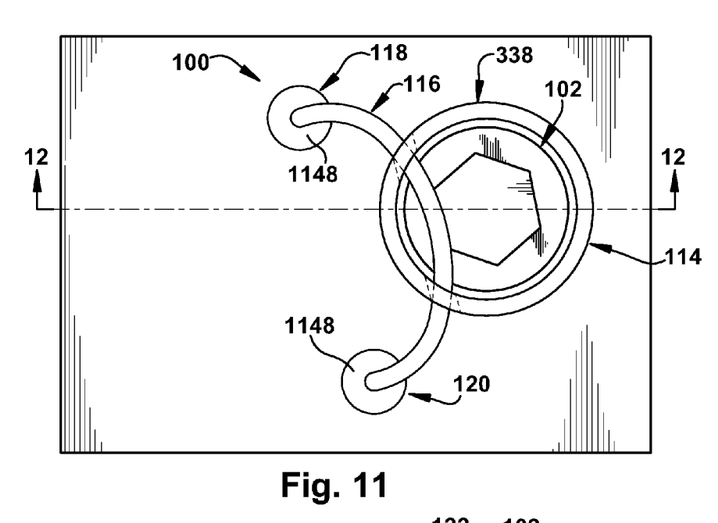
FIG. 11 is a partial schematic top view of the embodiment of FIG. 1 in an example use environment.
Figure 12:
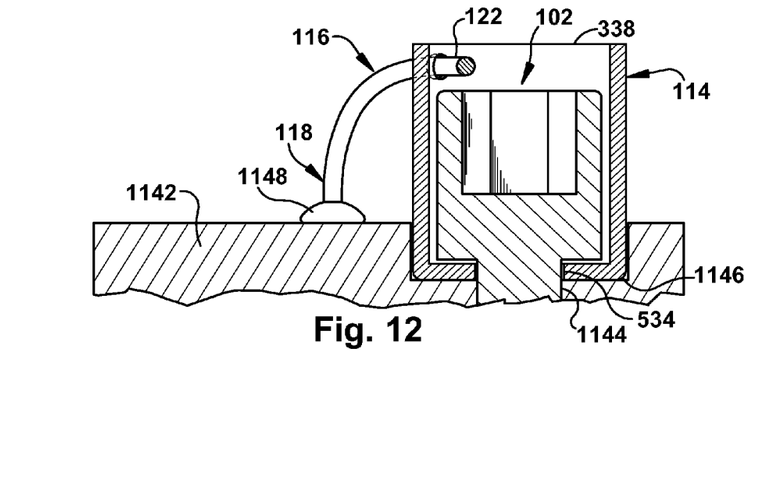
FIG. 12 is a cross-sectional view taken along line 12-12 of FIG. 11.

FIGS. 11-12 depict an example use of the fastening system 100. In FIGS. 11-12, the fastener 102 is shown as penetrating into an anchor structure 1142, which may be a body structure having a structure aperture 1144. The body structure may be of any suitable type, including an apparatus intended for outer space, underwater, remote location, or any other desired use environment. An example of a suitable use environment is in the field of spacecraft mechanical ground support equipment (A.K.A., "MGSE"). MGSE equipment includes, but is not limited to, slings, lift fixtures, spacecraft support structures, personnel work platforms and access platforms, spacecraft rotation fixtures, dollies, carts, deployment mechanisms, zero-G mechanisms, proof load fixtures, and the like, which is used in close proximity to spacecraft or, in some cases, is temporarily attached to the spacecraft. MGSE equipment is generally used in a controlled foreign object debris ("FOD") environment, to avoid pre-flight debris being left behind and posing a hazard to the spacecraft during/after launch. Aircraft use environments often have a similar, although usually less intense, FOD-controlled environment to avoid damage from loose hardware.

The structure aperture 1144 may be at least partially previously provided (e.g., via a pilot hole) or may be created through a material-removal action of the fastener 102 itself (e.g., when the fastener is a self-tapping screw). Optionally, the structure aperture 1144 could include a counterbored portion 1146 to accept at least a portion of the cavity washer 114 therein, below the surface of the anchor structure 1142. The structure aperture 1144 could be located in a single body structure, or could span two or more body structures, such as in a situation when a plurality of body structures are to be fastened together by the fastener 104.

It is also contemplated that the cavity washer 114 itself (or the functions thereof) could be provided by a portion (e.g., a boss, not shown) of the anchor structure 1142, such that the cavity washer and anchor structure are provided in a unitary manner, separate from the fastener 104. However, for ease of description, the below description presumes that the cavity washer 114 and other components of the fastening system 100 are separate structures from the anchor structure 1142 at the time of use.

Regardless of whether the fastening system 100 is assembled in advance or on-the-fly, the components of the fastening system 100 may be arranged with respect to the anchor structure 1142 such that the fastener shaft 108 is simultaneously located at least partially in the fastener aperture 534 and at least partially in the structure aperture 1144, and the fastener 102 can be engaged with the anchor structure in any desired manner. For example, a bolt-type fastener 102 could be inserted through the cavity washer 114, into a prepared structure aperture 1144, and tightened into an engaged relationship. When the tether body 122 is simultaneously extended through both of the tether apertures 126 (either before or after engagement of the fastener 102 with the anchor structure 1142), at least one of the first and second tether ends 118 and 120 is tetheringly attached to at least one body structure. This attachment of the first and second tether ends 118 and 120 to at least one body structure could be accomplished, for example, via attachment (which could be permanent or reversible) of the tether end(s) to tether anchors 1148 attached to the anchor structure.

The fastening system 100 thereby can prevent the fastener 102 from becoming lost or detached from the anchor structure 1142 through the depicted arrangement. Even if the fastener 102 becomes removed from the structure aperture 1144, the tether body 122 will block the fastener head 104 from exiting the cavity washer 114 in a first longitudinal direction, and the base surface 532 will block the fastener head from exiting the cavity washer in a second longitudinal direction, opposite the first longitudinal direction. Since the cavity washer 114 is tethered to the anchor structure 1142 by engagement of the tether 116 with at least one tether anchor 1148, the fastener 102 therefore must also remain connected (indirectly) to the anchor structure through engagement with the cavity washer. It is also contemplated that the anchor structure could be another fastener and cavity washer pair (not shown) which is either installed for the express purpose of serving as an anchor structure, or which is, itself, a portion of the fastening system, provided primarily for a fastening purpose but also/instead serving an anchor function for one or more other fastener and cavity washer pairs.

When it is desired for the fastener 102 to exit the cavity washer 114, the tether body 122 can be repositioned with respect to the fastener head 104 to allow the fastener head to exit the fastener cavity 640 through movement of the fastener oriented longitudinally away from the base surface 532. For example, the tether body 122 could be removed from one or both tether apertures 126 to allow longitudinal passage of the fastener head 104. As another example, the tether 116 could be slackened sufficiently to allow the tether body 122 to be pulled away from the blocking position such that the tether body is still extending through the tether apertures 126 but the fastener head 104 is no longer blocked from longitudinal movement out of the cavity washer 114.

As another option for disconnection of the fastening system 100 from an anchor structure 1142, at least one of the first and second tether ends 118 and 120 can be released from the anchor structure. When both of the first and second tether ends 118 and 120 are released, the fastener 102 can be withdrawn from the structure aperture 1144 and the entire assembled fastening system 100 removed. When one of the first and second tether ends 118 and 120 is released and the other retained, the tether 116 can be withdrawn from at least one of the tether apertures 126 and the fastener 102 removed, with or without the cavity washer 114.

Figure 13:
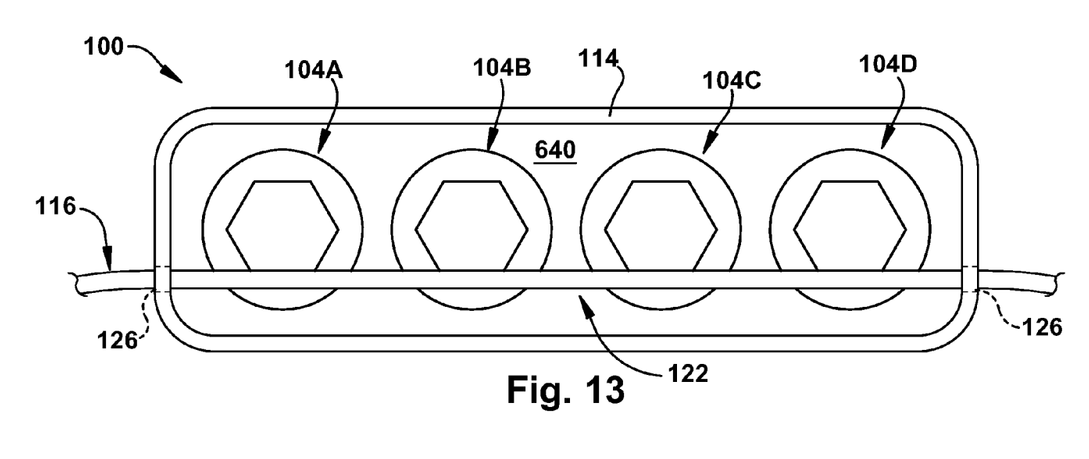
FIG. 13 is a partial schematic top view of an alternate configuration of the embodiment of FIG. 1.
Figure 14:
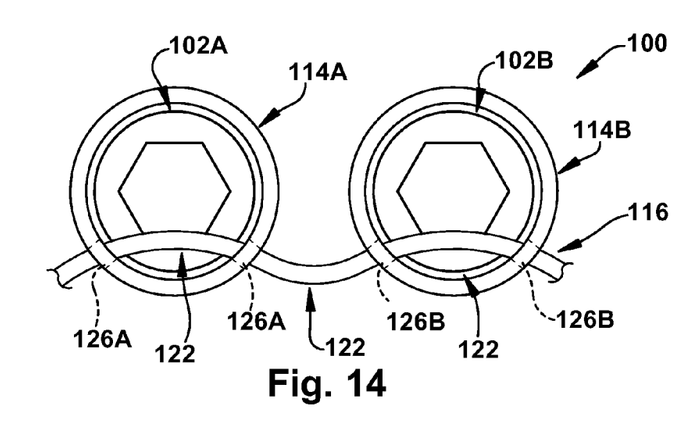
FIG. 14 is a partial schematic top view of an alternate configuration of the embodiment of FIG. 1.

FIGS. 13-14 show example alternate configurations of the fastening system 100. In FIG. 13, the cavity washer 114 is a first cavity washer 114A, and the fastener 102 is a first fastener 102A. A second tetherable cavity washer 114B and a second fastener 114B, which have substantially similar features (with respect to their ability to accept a tether 116) to the first cavity washer 114A and the first fastener 102A, respectively, are provided. The second fastener 102B and the second cavity washer 114B are engaged together through insertion of a second fastener shaft 108B into a second fastener aperture 534B. The tether body 122 then extends simultaneously through both of the tether apertures 126B of the second cavity washer 114B and through both of the tether apertures 126A of the first cavity washer 126A. In the arrangement of FIG. 13, a plurality of substantially similar cavity washers 114 and their corresponding fasteners 102 can be chained together with a single tether 116.

In contrast, in FIG. 14, a single elongate cavity washer 114 is provided. The cavity washer 114 has a plurality of fastener apertures 534 (not visible in this view), through which a plurality of fasteners 104A, 104B, 104C, and 104D are engaged. A single tether 116, extending simultaneously through a pair of tether apertures 126, substantially and simultaneously blocks movement of all of the plurality of fasteners 104A, 104B, 104C, and 104D longitudinally upward and out of the cavity washer 114. While the single-cavity washer/multi-fastener arrangement shown in FIG. 14 is linearly arranged, one of ordinary skill in the art will readily be able to provide a single-cavity washer/multi-fastener arrangement having any suitable regular, irregular, symmetrical, asymmetrical, or any other desired configuration for a particular embodiment of the present invention. It is contemplated that intermediate tether holders (e.g., eyebolts, not shown, extending laterally from the wall 338) could be provided within the fastener cavity 640 to assist with maintenance of the tether body 122 in the desired blocking position, particularly when there is a relatively long lateral length "bridged" by the tether body 122 between the tether apertures 126.

In certain embodiments of the present invention, the tether 116 might not be attached to an anchor structure 1142, such as in the arrangement shown in FIGS. 1-2. In these embodiments, the blocking function provided by the presence of the tether body 122 longitudinally above the fastener head 104 may be sufficient to provide a desired anti-backout relationship between the cavity washer 114 and the fastener 102.

It is contemplated that the fastener aperture 534 could include threads or other features (not shown) to facilitate or allow relatively tight passage of the fastener shaft 108 therethrough. For example, when the fastener aperture 534 is threaded, the cavity washer 114 could act in a nut-type fashion and threadably engage with the fastener 102. As another example, an elastomeric or other resilient material could be located in and/or adjacent to the fastener aperture 534 to provide a sealing function between the fastener 102 and the cavity washer 114.

While any suitable number of tether apertures 126 could be provided by one of ordinary skill in the art, it is contemplated that, for most embodiments of the present invention, an even number of tether apertures will be provided to allow the tether 116 to enter and exit the fastener cavity 640. (Alternatively, the open top of the wall 338 could act as a tether aperture 126 to allow egress of a tether 116 from the fastener cavity 640, in conjunction with a single entrance tether aperture formed in the wall.) It is also contemplated that at least one of the first and second tether ends 118 and 120 could be temporarily or permanently fastened to the wall 338, thus obviating the need for a tether aperture 126 to allow that tether end 118 and/or 120 to engage with the cavity washer 114 as described herein.

As depicted in FIGS. 3-4, 7, 9-10, and 14, the tether apertures 126 are depicted as being coaxial with each other. For example, such coaxial tether apertures 126 could be drilled at the same time and/or in the same drill set-up by a drill that is in the lateral plane but "off-center" from the longitudinal axis of the fastener. Drilling coaxial tether apertures 126 in this manner may allow the tether cable to more closely approximate a straight-line "chord" routing as it extends longitudinally above the head of the screw, which may be particularly helpful in an embodiment in which the same tether 116 is used with multiple cavity washers 114. Also, drilling both tether apertures 126 concurrently, with a single drill set-up, could provide time and/or cost savings in manufacturing. However, and as shown in FIGS. 11-13, the tether apertures 126 of a single cavity washer 114 could instead each extend radially through the wall 338, such that an axis of each tether aperture intersects the longitudinal axis of the screw in a "spoke"-type, non-coaxial manner. This non-coaxial arrangement of tether apertures 126 may be helpful, for example, if space constraints or any other consideration prompt the user to keep the first and second tether ends 118 and 120 fairly close together as the tether 116 extends away from the cavity washer 114. One of ordinary skill in the art can readily provide any desired number of tether aperture(s) 126 having any desired matching or non-matching configuration, orientation, or other physical property for a desired use application of the present invention.

While aspects of the present invention have been particularly shown and described with reference to the preferred embodiment above, it will be understood by those of ordinary skill in the art that various additional embodiments may be contemplated without departing from the spirit and scope of the present invention. For example, an adhesive, solder, lock washer, or other engagement enhancing device could be provided to help maintain a desired engagement between structures of the fastening system 100. When a lock washer is used inside the fastener cavity 640 below the fastener head 104, the cavity washer 114 should be dimensioned to allow for the extra height and still permit passage of the tether body 122 above the fastener head within the fastener cavity. The specific methods described above for using the described fastening system 100 are merely illustrative; one of ordinary skill in the art could readily determine any number of devices, sequences of steps, or other means/options for tethering the fastener as described. Any of the described structures and components could be integrally formed as a single piece or made up of separate sub-components, with either of these formations involving any suitable stock or bespoke components and/or any suitable material or combinations of materials. Though certain components described herein are shown as having specific geometric shapes, all structures of the present invention may have any suitable shapes, sizes, configurations, relative relationships, cross-sectional areas, or any other physical characteristics as desirable for a particular application of the present invention. Any structures or features described with reference to one embodiment or configuration of the present invention could be provided, singly or in combination with other structures or features, to any other embodiment or configuration, as it would be impractical to describe each of the embodiments and configurations discussed herein as having all of the options discussed with respect to all of the other embodiments and configurations. A device or method incorporating any of these features should be understood to fall under the scope of the present invention as determined based upon the claims below and any equivalents thereof.

Other aspects, objects, and advantages of the present invention can be obtained from a study of the drawings, the disclosure, and the appended claims.

Having described the invention, I claim:

1. A fastening system, comprising:
   a penetrating fastener, having a longitudinally separated fastener head and fastener tip spaced apart by an elongate, longitudinally oriented fastener shaft;
   a tetherable cavity washer, having:
   a substantially planar base surface having a fastener aperture extending longitudinally therethrough, the fastener aperture having at least one lateral dimension less than a corresponding lateral dimension of the fastener head,
   a longitudinally oriented wall extended longitudinally upward to at least a first longitudinal distance from at least a portion of the base surface to form a concave fastener cavity configured to receive at least a portion of the fastener head concurrently with at least a portion of the fastener shaft extending through the fastener aperture of the base surface, and
   two tether apertures extending laterally through the wall, the tether apertures being laterally spaced apart along the wall, and both of the tether apertures being laterally arranged along the wall in a rotationally asymmetric configuration, a first one of the tether apertures being located a second longitudinal distance from the base surface and a second one of the tether apertures being located a third longitudinal distance from the base surface, both the second and third longitudinal distances being greater than a longitudinal thickness of the fastener head; and
   an elongate tether, having first and second tether ends separated by a tether body, the tether apertures being configured to simultaneously accept the tether body extending through both of the tether apertures.

2. The fastening system of claim 1, being assembled by insertion of the fastener shaft into the fastener aperture to bring at least a portion of the fastener head into the fastener cavity, and placement of the tether body simultaneously through both of the tether apertures at a longitudinal position in which the tether body substantially prevents movement of the fastener head longitudinally out of the fastener cavity to maintain the fastener in a predetermined arrangement with the cavity washer.

3. The fastening system of claim 1, wherein the base surface has a base surface perimeter and the wall extends longitudinally upward to at least the first longitudinal distance from at least a portion of the base surface perimeter.

4. The fastening system of claim 3, wherein the base surface perimeter is substantially circular and the wall extends longitudinally upward from the entirety of the base surface perimeter to provide a cup-shaped cavity washer having a substantially cylindrical fastener cavity.

5. The fastening system of claim 1, wherein the fastener head includes a tool-engaging feature located opposite the fastener shaft and, when the tether body is simultaneously extending through both of the tether apertures, the tool-engaging feature is longitudinally accessible by a manipulation tool.

6. An apparatus having at least one body structure having a structure aperture, and including the fastening system of claim 1, wherein the fastener shaft is simultaneously located at least partially in the fastener aperture and at least partially in the structure aperture, and, when the tether body is simultaneously extended through both of the tether apertures, at least one of the first and second tether ends is tetheringly attached to at least one body structure.

7. A tetherable cavity washer, comprising:
   a substantially planar base surface having a fastener aperture extending longitudinally therethrough, the base surface having a base surface perimeter, and the entirety of the fastener aperture being located in a laterally spaced-apart relationship with the base surface perimeter;
   a longitudinally oriented wall extending longitudinally upward to at least a first longitudinal distance from at least a portion of the base surface perimeter; and
   two tether apertures extending laterally through the wall, the tether apertures being laterally spaced apart along the wall, and both of the tether apertures being laterally arranged along the wall in a rotationally asymmetric configuration.

8. The tetherable cavity washer of claim 7, wherein the wall extends longitudinally upward from the entirety of the base surface perimeter.

9. The tetherable cavity washer of claim 8, wherein the wall and base surface collectively define a concave fastener cavity.

10. The tetherable cavity washer of claim 7, wherein the base surface perimeter defines a curve and the tether apertures are arranged such that a linear tether extending between the two tether apertures and located longitudinally above the base surface defines a chord having a length of less than a diameter of the curve.

11. The tetherable cavity washer of claim 7, wherein a first one of the tether apertures is located a second longitudinal distance from the base surface and a second one of the tether apertures is located a third longitudinal distance from the base surface, both the second and third longitudinal distances being less than the first longitudinal distance.

12. The tetherable cavity washer of claim 11, wherein the second and third longitudinal distances are substantially the same.

13. The tetherable cavity washer of claim 11, wherein at least one of the second and third longitudinal distances is chosen responsive to a height of a fastener head of a fastener preselected for operative engagement with the tetherable cavity washer.

14. The tetherable cavity washer of claim 7, wherein a fastener is preselected for use with the tetherable cavity washer, the fastener having a longitudinally separated fastener head and fastener tip spaced apart by an elongate, longitudinally oriented fastener shaft, and wherein the fastener aperture is configured to accept the fastener shaft therethrough concurrently with at least a portion of the fastener head being located laterally adjacent the wall.

15. The tetherable cavity washer of claim 7, wherein the tether apertures are configured to simultaneously accept an elongate tether extending through both of the tether apertures.

16. A method of tethering a penetrating fastener, the fastener having a longitudinally separated fastener head and fastener tip spaced apart by an elongate, longitudinally oriented fastener shaft, the method comprising:
    providing a tetherable cavity washer, having:
    a substantially planar base surface having a fastener aperture extending longitudinally therethrough, the fastener aperture having at least one lateral dimension less than a corresponding lateral dimension of the fastener head,
    a longitudinally oriented wall extended longitudinally upward to at least a first longitudinal distance from at least a portion of the base surface to form a concave fastener cavity, and
    two tether apertures extending laterally through the wall, the tether apertures being laterally spaced apart along the wall, and both of the tether apertures being laterally arranged along the wall in a rotationally asymmetric configuration, a first one of the tether apertures being located a second longitudinal distance from the base surface and a second one of the tether apertures being located a third longitudinal distance from the base surface, both the second and third longitudinal distances being greater than a longitudinal thickness of the fastener head;
    inserting at least a portion of the fastener shaft through the fastener aperture;
    receiving at least a portion of the fastener head within the fastener cavity;
    providing an elongate tether, having first and second tether ends separated by a tether body;
    extending the tether body simultaneously through both of the tether apertures; and
    substantially blocking the fastener head, with a portion of the tether body extending between the two tether apertures, from exiting the fastener cavity through movement oriented longitudinally away from the base surface.

17. The method of claim 16, wherein, while the fastener head is substantially blocked with the portion of the tether body extending through the two tether apertures, at least one of the first and second tether ends is tetheringly attached to an anchor structure, separate from the fastener.

18. The method of claim 16, wherein the base surface perimeter is substantially circular and the wall extends longitudinally upward from the entirety of the base surface perimeter to provide a cup-shaped cavity washer having a substantially cylindrical fastener cavity, and the method includes substantially laterally surrounding the fastener head with the wall when the fastener head is at least partially located within the fastener cavity.

19. The method of claim 16, wherein the cavity washer is a first cavity washer, the fastener is a first fastener, and including:
    providing a second tetherable cavity washer and a second fastener having substantially similar features to the first cavity washer and the first fastener, respectively;
    engaging the second fastener and the second tetherable cavity washer through insertion of a second fastener shaft into a second fastener aperture; and
    extending the tether body simultaneously through both of the tether apertures of the second cavity washer and through both of the tether apertures of the first cavity washer.

20. The method of claim 16, including:
    providing the fastener head with a tool-engaging feature located opposite the fastener shaft; and
    making the tool-engaging feature longitudinally accessible by a manipulation tool when the tether body is simultaneously extending through both of the tether apertures.

21. The method of claim 16, including:
    repositioning the tether body with respect to the fastener head to allow the fastener head to exit the fastener cavity through movement oriented longitudinally away from the base surface.

22. The method of claim 17, including:
    releasing the at least one of the first and second tether ends from the anchor structure.

* * * * *